US011026073B2

(12) United States Patent
Haubner

(10) Patent No.: US 11,026,073 B2
(45) Date of Patent: Jun. 1, 2021

(54) METHOD FOR COUPLING AN END VEHICLE TO A STATIONARY DATA NETWORK, AND SYSTEM FOR CARRYING OUT THE METHOD

(71) Applicant: AUDI AG, Ingolstadt (DE)

(72) Inventor: Florian Haubner, Willanzheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/644,134

(22) PCT Filed: Oct. 22, 2018

(86) PCT No.: PCT/EP2018/078885
§ 371 (c)(1),
(2) Date: Mar. 3, 2020

(87) PCT Pub. No.: WO2019/115070
PCT Pub. Date: Jun. 20, 2019

(65) Prior Publication Data
US 2020/0275245 A1      Aug. 27, 2020

(30) Foreign Application Priority Data

Dec. 15, 2017   (DE) .................... 10 2017 222 905.5

(51) Int. Cl.
*H04W 4/44* (2018.01)
*H04W 4/46* (2018.01)
(Continued)

(52) U.S. Cl.
CPC ............ *H04W 4/44* (2018.02); *H04W 4/023* (2013.01); *H04W 4/46* (2018.02); *H04W 40/20* (2013.01);
(Continued)

(58) Field of Classification Search
CPC ....... H04W 4/44; H04W 4/023; H04W 40/20; H04W 84/18; H04W 88/04; H04W 4/46; H04W 84/005
(Continued)

(56) References Cited

U.S. PATENT DOCUMENTS

| 8,190,322 B2 | 5/2012 | Lin et al. |
| 8,447,231 B2 | 5/2013 | Bai et al. |

(Continued)

FOREIGN PATENT DOCUMENTS

| DE | 102010004161 A1 | 8/2010 |
| DE | 102011116972 A1 | 6/2012 |

(Continued)

OTHER PUBLICATIONS

International Preliminary Report on Patentability directed to related International Patent Application No. PCT/EP2018/078885, dated Nov. 21, 2019, with attached English-language translation; 19 pages.

(Continued)

*Primary Examiner* — John A Tweel, Jr.
(74) *Attorney, Agent, or Firm* — Sterne, Kessler, Goldstein & Fox P.L.L.C.

(57) ABSTRACT

The disclosure relates to a method for linking a terminal vehicle to a stationary data network. The disclosure provides that a base vehicle, which has an unmediated network access to the data network, uses a radio-based communication device to transfer data packets between the data network and the terminal vehicle.

8 Claims, 2 Drawing Sheets

(51) Int. Cl.
  *H04W 84/00* (2009.01)
  *H04W 4/02* (2018.01)
  *H04W 84/18* (2009.01)
  *H04W 40/20* (2009.01)
  *H04W 88/04* (2009.01)

(52) U.S. Cl.
  CPC ......... *H04W 84/005* (2013.01); *H04W 84/18* (2013.01); *H04W 88/04* (2013.01)

(58) Field of Classification Search
  USPC ........................................................ 340/993
  See application file for complete search history.

(56) References Cited

U.S. PATENT DOCUMENTS

| | | | | |
|---|---|---|---|---|
| 8,718,797 | B1* | 5/2014 | Addepalli | B60R 16/023 700/17 |
| 9,386,462 | B2* | 7/2016 | Scheim | H04B 1/3822 |
| 9,386,624 | B2* | 7/2016 | Scheim | H04W 48/10 |
| 9,451,020 | B2* | 9/2016 | Liu | H04W 4/44 |
| 10,225,746 | B2* | 3/2019 | Mohammed | H04W 12/06 |
| 10,395,531 | B2 | 8/2019 | Voight et al. | |
| 2007/0237101 | A1 | 10/2007 | Cohen et al. | |
| 2012/0303829 | A1* | 11/2012 | LaFrance | B60L 53/665 709/229 |
| 2015/0296019 | A1 | 10/2015 | Onishi et al. | |
| 2016/0107532 | A1 | 4/2016 | Park | |

FOREIGN PATENT DOCUMENTS

| | | |
|---|---|---|
| DE | 102015107745 A1 | 11/2016 |
| EP | 2527189 A2 | 11/2012 |
| WO | WO 2016/080735 A1 | 5/2016 |
| WO | WO 2017/153225 A1 | 9/2017 |

OTHER PUBLICATIONS

International Search Report and Written Opinion of the International Searching Authority directed to related International Patent Application No. PCT/EP2018/078885, dated Jan. 18, 2019, with attached English-language translation; 19 pages.

* cited by examiner

S10 = Setting up or configuring a network access

S12 = Transferring data packets

METHOD FOR COUPLING AN END VEHICLE TO A STATIONARY DATA NETWORK, AND SYSTEM FOR CARRYING OUT THE METHOD

TECHNICAL FIELD

The disclosure relates to a method for linking a motor vehicle to a stationary data network, for example the Internet.

BACKGROUND

From WO 2016/080735 A1 it is known that devices with a 5G mobile radio module can communicate with one another or exchange data directly, i.e. bypassing a base station of the 5G mobile radio network.

From DE 10 2015 107 745 A1 it is known that in a data network a connection to a server can take place indirectly via a plurality of relay stations, wherein a relay station can signal to other nodes that it has a connection to the server.

From US 2015/0296019 A1 it is known that a motor vehicle can indirectly transmit data to be sent into the Internet via another motor vehicle, the data initially being held in a data memory and there then being a wait for an opportunity to send it out. Whenever there is an opportunity to transmit the stored data to the Internet or to another motor vehicle, this opportunity is taken without considering whether the other motor vehicle will ever have an Internet connection.

DE 10 2011 116 972 A1 shows that a server for a respective delegation zone can determine a delegated vehicle that distributes data locally. Variables for selecting a delegated motor vehicle include, among other things, the location of a vehicle and the direction of travel of the vehicle, and the number of recent and/or historical communications of the vehicle.

DETAILED DESCRIPTION

Figure 1:
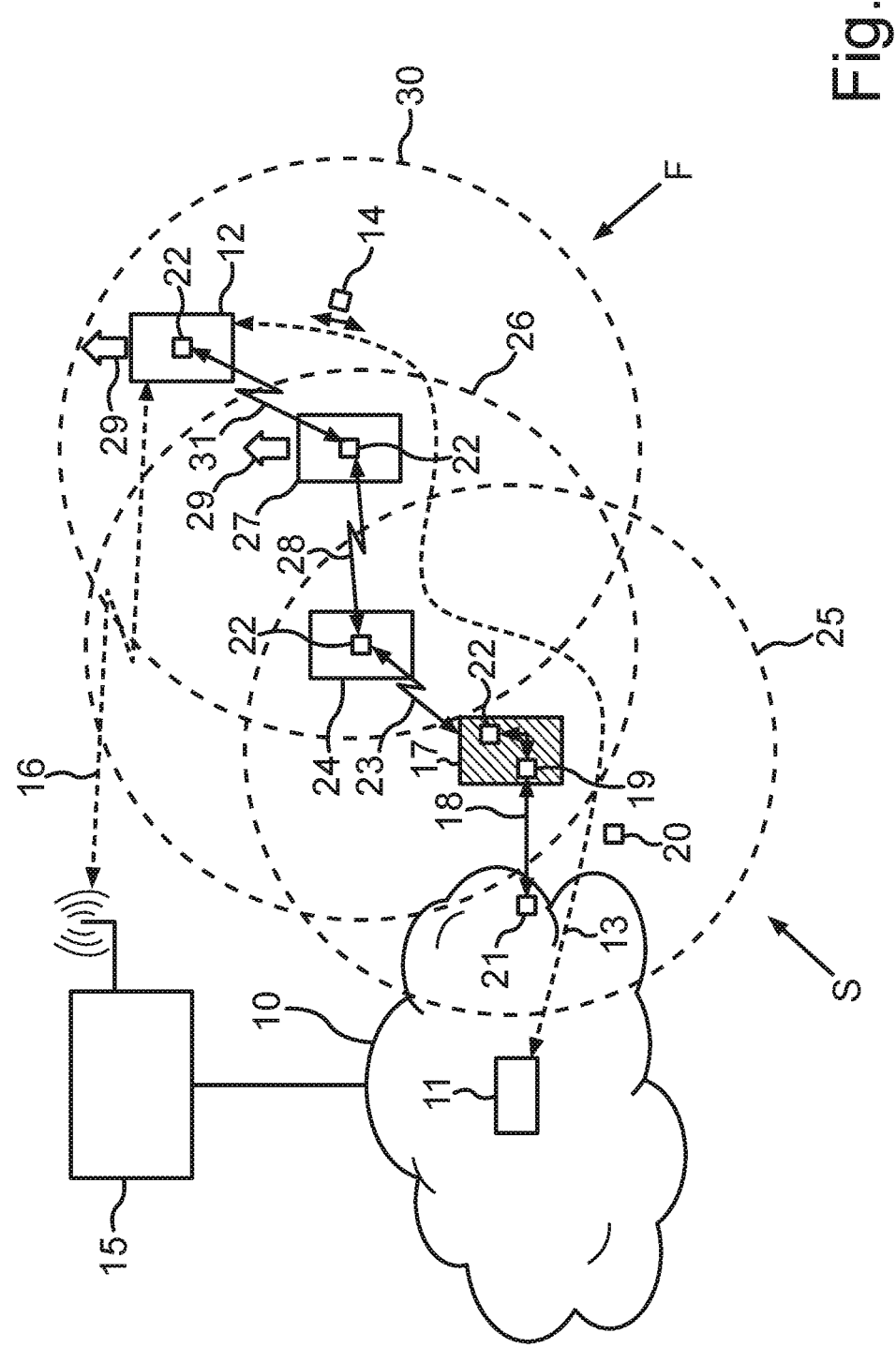
FIG. 1 is a schematic illustration of one embodiment of the system according to the disclosure.

The disclosure relates to a method for linking a motor vehicle to a stationary data network, for example the Internet. The motor vehicle forms the end of a communication link and is therefore referred to below as a terminal vehicle. The other end of the communication link can be formed, for example, by a server device of the data network. The disclosure also includes a system by means of which the method according to the disclosure can be carried out.

Exporting data from a motor vehicle to a server device in a stationary data network can be costly because transmission over a cellular connection may be necessary. Nevertheless, this data export is necessary in order, for example, to be able to generate map data for piloted driving functions on the basis of data from different motor vehicles. The more data that can be transmitted, for example raw data from sensors, the more information can be gained from the data. For example, by transmitting raw data, algorithms for a driving function or for object detection in a server device of the data network can be improved and/or their malfunctions can be analyzed.

As already stated, however, the transmission of data by means of mobile radio is expensive. For this reason, there is currently only a limited possibility of transferring amounts of data from a motor vehicle to a server device.

The object of the disclosure is to exchange or transmit data between a motor vehicle and a stationary data network, in particular the Internet.

The object is achieved by the subject matters of the independent claims. Advantageous developments of the disclosure are described by the dependent claims, the following description and the drawing figures.

The disclosure provides a method for linking a terminal vehicle to a stationary data network. The data network may be the Internet, for example. It is characterized as a stationary data network in that it has stationary lines, for example cables. A motor vehicle that represents or forms the end of a communication link is referred to here as the terminal vehicle. The other end of the communication link can be formed, for example, by a stationary server device of the data network. Such a server device can be formed by a computer or a computer network. Data packets are to be transmitted via the communication link.

According to the disclosure, it is now provided that the terminal vehicle does not exchange the data packets with the stationary data network, for example via a mobile radio connection. Rather, another motor vehicle is provided, which is referred to here as the base vehicle. The base vehicle has an unmediated network access or direct data network access to the data network. In other words, the base vehicle can receive the data packets (depending on the direction of transmission) directly from the data network or feed them directly into the data network. The base vehicle also uses a radio-based communication device to route the data packets between the data network and the terminal vehicle. In other words, a radio link is operated or provided by the base vehicle using the radio-based communication device, via which the data packets can be received from the terminal vehicle and then fed into the data network by the base vehicle or (in the opposite direction of transmission) the base vehicle can initially receive the data packets directly from the data network and then forward them over the radio link by means of the radio-based communication device.

The advantage of the disclosure is that the terminal vehicle does not have to provide or maintain its own mobile radio connection to the stationary data network via a base station of a mobile radio network in order to exchange the data packets with the data network. Rather, it is sufficient if the terminal vehicle exchanges data packets with the base vehicle via a radio link. No cellular connection to the cellular network is required for this radio connection. In particular, there are no mobile phone charges for this radio connection from a mobile operator. For example, the vehicle-to-vehicle communication known per se can be used by means of a WiFi standard.

The disclosure provides that for a range extension, i.e. if radio-based direct communication between the base vehicle and the terminal vehicle is impossible due to the distance between the two being too great, at least one intermediary vehicle links the base vehicle to the terminal vehicle and the at least one intermediary vehicle transfers the data packets between the base vehicle and the terminal vehicle. An intermediary vehicle therefore represents a relay station and can therefore also be referred to as a relay vehicle. The communication link between the terminal vehicle and the stationary data network is therefore not only routed via the base vehicle, but also via at least one intermediary vehicle. The described 5G-based vehicle-to-vehicle communication can also be used for this.

According to the disclosure, a predetermined routing protocol is used or provided for the linking of the terminal vehicle to the data network, according to which a connectivity expectation is checked for a plurality of possible other vehicles by the terminal vehicle and/or by a respective intermediary vehicle and/or by the base vehicle and indicates the usability of the respective other vehicle as a possible intermediary vehicle or base vehicle. The data packets are then transmitted at least to one of these other vehicles which, with the highest probability and/or in the shortest time of all checked vehicles, will reach a reception range of an intermediary vehicle or of the base vehicle or of the terminal vehicle or will itself become the base vehicle. In other words, the communication link between the terminal vehicle and the data network is established by a vehicle already involved in the communication link (base vehicle/intermediary vehicle/terminal vehicle) checking a plurality of other possible vehicles with regard to their connectivity expectation. It is therefore determined whether another vehicle is suitable for expanding or establishing the communication link. The data packets are then transmitted at least to the most suitable vehicle that will reach a reception area of an intermediary vehicle or of the base vehicle or of the terminal vehicle or that will itself become a base vehicle, that is, it will have an unmediated network access to the data network. This has the advantage that the probability of a successful and/or fast transmission of the data packets is maximized.

In order to route the data packets within the radio network of the system, that is, for deciding which data packets are to be forwarded to which node, the connectivity expectation of the individual nodes is evaluated. This is determined by the knowledge of the nodes themselves from the current position and current connectivity, predicted position based on the expected charging time, route, immobilization time and/or connectivity predicted thereby.

The disclosure also includes embodiments which yield additional advantages.

According to one embodiment, said unmediated network access is provided by the base vehicle transferring the data packets while it is connected to an electrical charging post via a charging cable for an electrical charging process and there is network access to the data network. The network access can be provided via the charging cable (for example according to a so-called Powerline Communication—PLC). Additionally or alternatively, the base vehicle can transfer the data packets while a network access device of the base vehicle, for example a WiFi communication device, is linked to a predetermined home WLAN of a user of the base vehicle (WLAN—wireless local area network) and/or while the network access device is linked to a public WiFi. With these connection types, there is advantageously no mobile phone charge for the use of a mobile radio network. The base vehicle can thus exchange data packets with the stationary data network without having to pay mobile phone charges for the use of a mobile network. A mobile phone connection via a mobile radio network is therefore not a direct, but an indirect network access to the stationary data network, since data packets must first be routed through the cell phone network in order to reach the data network or (in the opposite direction of transmission) to be able to be sent out to a mobile device or a mobile phone module of a motor vehicle by radio.

According to one embodiment, the radio-based communication from the base vehicle to the terminal vehicle is based on the fact that the radio-based communication device of the base vehicle is based on a 5G standard, i.e. on a mobile radio standard, but in this case the data packets are transferred independently of any base station of a 5G network via a 5G-based vehicle-to-vehicle communication. This is also known as the VANET—Vehicular Ad Hoc Network. The base vehicle can, for example, send out a notification signal or offering signal by means of the radio-based communication device, which signals to other motor vehicles, in particular to the terminal vehicle, that the base vehicle can provide an unmediated network access and can transfer data packets.

The at least one intermediary vehicle can be, for example, a parked vehicle and/or at least one moving vehicle. The use of a parked vehicle has the advantage that it maintains its position unchanged while the data packets are being transferred, and thus a disconnection due to the increasing distance of an intermediary vehicle is avoided. The use of a moving vehicle has the advantage that the data packets can be physically moved or transported by means of the moving vehicle so that they can then be forwarded after a time delay.

It is accordingly provided by one embodiment that the at least one intermediary vehicle receives the data packets for the transfer and forwards them only at a later point in time if at least one predetermined connection condition is met. In other words, the data packets are received and then forwarded after a time delay, for example with a time delay of more than 10 seconds or more than 1 minute. It is therefore advantageously not necessary to provide a continuous communication link between the base vehicle and the terminal vehicle. Rather, the data packets can always be forwarded when there is a current opportunity to do what the person skilled in the art can determine through the connection condition. For example, the connection condition may state that the data packets are forwarded if there is a radio-based communication connection to the base vehicle or to the terminal vehicle or to another intermediary vehicle which (depending on the direction of transmission) is closer to the base vehicle or the terminal vehicle.

One embodiment provides that the connectivity expectation is checked on the basis of a current position and a planned and/or predicted driving route and/or on the basis of a charging state of an energy store of the respective other vehicle and/or an expected charging time and/or a destination of the respective checked vehicle. On the basis of the current position and the driving route, it can be recognized whether and/or when a reception range of an intermediary vehicle or of the base vehicle is reached. Based on a charging state, it can be recognized whether the vehicle itself will soon stop at a charging station and can thus function as the base vehicle. Based on an expected charging time, it can be determined how long the vehicle will recharge its energy store and how long it will therefore also be connected to the data network. A destination can be used to determine whether the vehicle will soon be able to reach its home WLAN.

However, the data packets do not have to be transmitted only to the vehicle with the greatest probability and/or with the shortest time. One embodiment provides that copies of the data packets, starting from the base vehicle or the terminal vehicle or an intermediary vehicle, are each sent out to a plurality of intermediary vehicles for forwarding. In other words, a scatter effect is used. In other words, a plurality of possible transmission routes are used. The copies are deleted after a predetermined period of time and/or after a predetermined number N of forwardings (between vehicles). A forwarding is also known in English as a "hop." The deletion takes place after N hops. The deletion takes place if the respective copy has not yet reached a predetermined recipient, in particular the terminal vehicle or the base vehicle. As a result, a plurality of possible routes are advantageously used or tried for forwarding the data packets without there being a data jam due to too many copies.

The checking of the connectivity expectation and/or the sending out of the copies can be decided or controlled by the respective transmitting vehicle and/or the respective receiving vehicle and/or by a central coordination device, for example the central server device of the data network.

The data packets can be exchanged in the said manner between a server device of the data network and the terminal vehicle. Both directions of transmission are possible. Debug data, sensor data, camera images, map data, a map update, a software update and/or user behavior data can be transmitted as data packets, only one data type, a plurality of data types or a plurality of the named data types being transmittable, respectively.

Provision can furthermore be made for predetermined, time-critical data packets not to be transferred via the base vehicle, but rather be transmitted between the terminal vehicle and the data network via a mobile radio connection and a mobile radio network. It can be provided that only predetermined, non-time-critical data packets are transferred via the base vehicle in the manner described.

The disclosure also includes a system for linking a terminal vehicle to a stationary data network, for example to the Internet. The system can include the base vehicle and additionally the terminal vehicle and/or at least one intermediary vehicle. At least it is provided that the system comprises a base vehicle, which is configured to transfer data packets between the data network and a terminal vehicle when there is unmediated (direct) network access to the data network by means of a radio-based communication device. In the manner described, the unmediated network means in particular that the data packets are exchanged between the base vehicle and the data network without a mobile radio network.

The system comprises embodiments which have features as have already been described in connection with the embodiments of the method according to the disclosure. For this reason, the corresponding features of the embodiments of the system according to the disclosure are not described again here.

The disclosure also includes the combinations of the described embodiments.

In the following an exemplary embodiment of the disclosure is described.

FIG. 1 is a schematic illustration of one embodiment of the system according to the disclosure.

Figure 2:
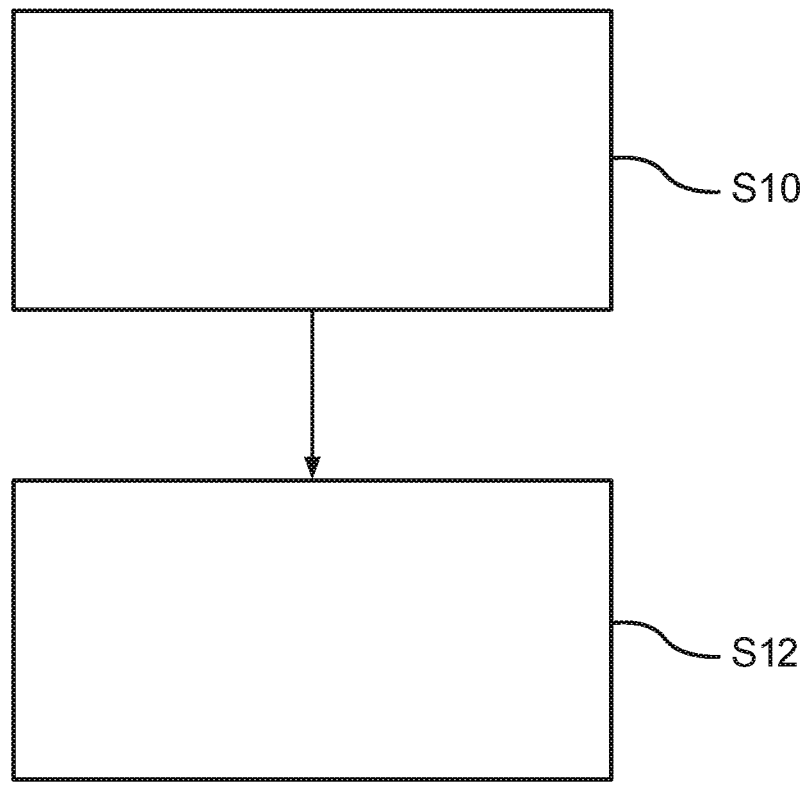
FIG. 2 is a flow diagram illustrating an embodiment of the method according to the disclosure.

FIG. 2 is a flow diagram illustrating an embodiment of the method according to the disclosure.

The exemplary embodiments described below are preferred embodiments of the disclosure. In the exemplary embodiments, the components of the embodiments that are described each constitute individual features of the disclosure to be considered independently of each other and which individually also further develop the disclosure independently of each other and are thus also to be considered part of the disclosure both individually and in a combination that is different from the combination described. In addition, the embodiments described may also be supplemented by further features of the disclosure, which have already been described.

In the drawings, functionally identical elements are denoted with the same reference characters.

FIG. 1 shows a stationary data network 10, which may be, for example, the Internet, in particular the portion of the Internet provided by stationary data lines, such as cables. In the data network 10, a server device 11 can be provided which can function or be configured, for example, as a backend for a vehicle fleet. With the server device 11, a terminal vehicle 12 can maintain or operate a communication link 13 in order to exchange data packets 14. Data packets 14 may be transmitted from the server device 11 to the terminal vehicle 12 (for example data packets for a software update or a map update) or from the terminal vehicle 12 to the server device 11 (for example data packets with backup data or diagnostic data or sensor data). The terminal vehicle 12 can dispense with indirectly exchanging or transmitting the data packets via a mobile radio network 15 by means of a mobile radio connection 16.

Instead, it can be provided that the data packets 14 are transferred via a base vehicle 17, which operates or has an unmediated or direct network access 18 to the data network 10. In other words, the base vehicle 17 can be connected to the data network 10, for example via a router. The base vehicle 17 can have a network access device 19 for the network access 18. The network access device 19 can be, for example, an Ethernet controller and/or a WiFi controller. The network access 18 can be, for example, based on an Ethernet connection via an Ethernet cable or a powerline cable, for example an electrical charging station 20, or a WiFi radio connection to a WiFi router 21 of the data network 10.

The base vehicle 17 can furthermore have a radio-based communication device 22, which can in particular be a mobile radio module according to the 5G standard. The base vehicle 17 can use the communication device 22 to operate or provide a radio link 23 to the terminal vehicle 12 or (as shown in FIG. 1) to an intermediary vehicle 24. For this purpose, the base vehicle 17 and the intermediary vehicle 24 can likewise each have a communication device 22 of the type mentioned. The radio connection 23 can in particular be based on an embodiment of the 5G standard in which no base station of the mobile radio network 15 is used but a direct radio connection 23 is provided between two communication devices 22 in each case. The base vehicle 17 may be a parked vehicle. The intermediary vehicle 22 can also be parked, for example. The intermediary vehicle 22 may be within a range 25 of the communication device 22 of the base vehicle 17. In contrast, the terminal vehicle 12 may be arranged outside the range 25. To extend the range, the intermediary vehicle 24 can then find within the range 26 of its communication device 22, for example by means of a connection condition another intermediary vehicle 27, which can also have a communication device 22, so that a further radio connection 28 can be established or provided between intermediary vehicle 24 and intermediary vehicle 27. The connection condition may, for example, stipulate that the intermediary vehicle 27 must be positioned between the intermediary vehicle 24 and the terminal vehicle 12, which can be determined, for example, by means of a GNSS (Global Navigation Satellite System), for example the GPS (Global Positioning System). In FIG. 1 it is illustrated, by way of example, that the intermediary vehicle 27 can move at a driving speed 29. The terminal vehicle 12 can also move at a driving speed 29. The intermediary vehicle 27 is within the range 26 of the intermediary vehicle 24. The intermediary vehicle 27 can have a range 30 by means of its communication device 22 in which the terminal vehicle 12 can be located. The intermediary vehicle 27 and the terminal vehicle 12 can also each have a communication device 22. A radio connection 31 can thus also be established or provided between the intermediary vehicle 27 and the terminal vehicle 12. Thus, by transferring the data packets 24 via the base vehicle 17 and the two intermediary vehicles 24, 27 shown here by way of example, the communication link 13 between the server device 11 and the terminal vehicle 12 can be provided without having to use the mobile radio network 15 or any base station of any mobile radio network.

The vehicles 12, 17, 24, 27 can each be, for example, a motor vehicle, in particular a passenger car or truck. Overall, this results in a system S for providing a separate radio network F.

FIG. 2 shows a method as can be implemented with the base vehicle 17 via the system S shown overall in FIG. 1. In a step S10, the base vehicle 17 can set up or configure the network access 18 and then its range 25 can set up a radio connection 23 with a terminal vehicle or an intermediary vehicle 24. In a step S12, the base vehicle 17 can then transfer data packets 14 between the data network 10 and the radio link 23. A terminal vehicle 12 or an intermediary vehicle 24 can thus introduce or receive data packets 14 into the data network 10 via a direct radio connection 23, without having to use a mobile radio network or a base station of a mobile radio network.

The unmediated network access is based in particular on a wired connection to the data network 10 or a WiFi-based connection to the data network 10.

Starting from the base vehicle 17, the radio connections 23, 28, 31 and the possible further radio connections within the ranges 25, 26, 30 result as a whole in the radio network F of the system S. It is a radio network F which does not require an infrastructure of a mobile radio network 15. Instead of a base station or instead of base stations of the mobile radio network 15, base vehicles such as base vehicle 17 are provided with direct network access 18.

Data packets 14 which are relevant for a central server device 11 do not have to be time-critical (for example map data, map updates, software updates, user behavior). As a rule, minutes are not important. More and more data traffic of this type will arise with new vehicle models. In particular, the mobile phone fees for vehicles and roaming are very expensive and can lead to many data transfers not being lucrative. In order to reduce the costs for exporting the data from a terminal vehicle 12 to a server device 11 and for updating information in the direction of the terminal vehicle in the medium and long term, the system S can be used to set up a separate 5G mobile radio network independently of a mobile radio provider of a mobile radio network 15.

There is usually little data volume for the exchange of time-critical data (e.g. hazard warning on a specific route), since this data is usually quite compact. A cellular network 15 of a cellular provider can be used as the fallback level for such data.

The mobile radio network of System S itself, on the other hand, is made up of the following nodes. Each node preferably has a 5G module (communication device 22) and memory specifically for buffering data packets 14:

Base vehicle 17 or a plurality of base vehicles: Nodes with direct Internet access (e.g. via Internet at charging post, home WiFi, public WiFi): These nodes make the connection to the Internet (data network 10) available to other nodes via 5G.

Parked intermediary vehicles 24: Static nodes without direct Internet access (parked vehicles): These nodes each extend the range of the network by the radius of their 5G range 26 and can forward data packets 14 to or from nodes having direct Internet access. It is also possible to forward data packets 14, for example, only via ten nodes until a node with direct Internet access can transmit the data packets 14 to a server device 11.

Moving intermediary vehicles 27: Dynamic nodes without direct Internet access (moving vehicles): These nodes can communicate via static nodes or via other dynamic nodes. If there is currently no connectivity, the data packets 14 are buffered and sent at a later point in time.

In order to route the data packets 14 in the radio network of the system S, that is, for deciding which data packets 14 are to be forwarded to which node, the connectivity expectation of the individual nodes is evaluated. This is determined by the knowledge of the nodes themselves from the current position and current connectivity, predicted position based on the expected charging time, route, immobilization time and/or connectivity predicted thereby. Copies of the data packets 14 can also be forwarded to a plurality of nodes and discarded in the radio network after a specific time in order to increase the probability that the message is present on the server device 11 or the terminal vehicle 12 within a specific time.

The latencies in one's own radio network can sometimes be very high (especially at the beginning when a few vehicles are equipped).

An example of this is small numbers of vehicles in a rural region, all of which have no Internet connection via their own mobile network. These vehicles can forward the data packets to a nearby vehicle that is most likely to come next in a connectivity zone because, for example, it is currently calculating a route in an urban region. In this case, latency would be minutes or hours.

Electric vehicles in particular must be connected with a charging cable for a longer period during the charging cycles. Direct communication from vehicle to vehicle is possible via technologies such as 5G.

A hybrid method is therefore proposed which uses vehicles located on the charging cable as base stations/base vehicles of its own radio network and also uses other moving vehicles as relay stations or intermediary vehicles. In addition, a separate radio network consisting of all 5G-capable vehicles will be set up. A separate radio network F can thus be set up via which data packets 14 are transmitted, for example with vehicle sensor information or other data.

Charging stations can be equipped with a broadband connection to the data network 10 (power cables have to be laid for the most part anyway). A data line can be integrated into the charging plug of the charging station 20.

Vehicles that are currently charging serve as base stations or base vehicles of the radio network (have a connection to the Internet via a charging station and can make this connection available to other vehicles via 5G).

Vehicles that are not currently charging but driving can communicate with the charging vehicles. Whenever another charging vehicle can be reached, buffered data packets 14 can be transmitted to a server device 11. In addition, moving vehicles serve as relay stations or intermediary vehicles in order to make the charging vehicles available for vehicles that are further away and thereby increase the range.

As soon as there are enough vehicles in System S, the communication service can also be offered to other users.

The essence of the whole is the fact that most debug data and raw sensor data have a large amount of data, but are not time-critical and therefore do not have to be exported directly.

For exporting when there is poor availability of charging vehicles, it would be conceivable to develop a separate routing protocol that forwards the data packets to other vehicles with 5G communication device 22, which, according to the route, is more likely or earlier to come within range of one's own radio network.

Time-critical data can still be sent via mobile service providers, especially at the beginning when network coverage is poor (due to fewer vehicles with 5G). This is usually a small amount of data (e.g. local hazard warnings).

Overall, the examples show how the disclosure allows a separate 5G mobile radio network between motor vehicles to be set up.

The invention claimed is:

1. A method for linking a terminal vehicle to a stationary data network, the method comprising:
   checking, by the terminal vehicle, a connectivity expectation for a plurality of possible other vehicles, wherein the connectivity expectation indicates a usability of the plurality of possible other vehicles as a possible base vehicle;
   selecting, based on a predetermined routing protocol, by the terminal vehicle, a base vehicle out of the plurality of possible other vehicles, wherein the base vehicle is a part of a link connecting the terminal vehicle and the stationary data network, wherein the link has a highest probability and/or a shortest time compared with other possible links comprising a different base vehicle;
   transferring, by the base vehicle, data packets between the stationary data network and the terminal vehicle using a radio-based communication device of the base vehicle, wherein the base vehicle has a direct network access to the stationary data network;
   linking, by a broker vehicle, the base vehicle with the terminal vehicle for a range extension; and
   transferring, by an intermediary vehicle, the data packets between the base vehicle and the terminal vehicle for the range extension,
   wherein the connectivity expectation is determined from a predicted position based on a charging state of an energy store, a route, or a destination of the plurality of possible other vehicles, and
   wherein the base vehicle transfers the data packets while it is connected to an electrical charging station via a charging cable for an electrical charging process and the direct network access exists.

2. The method of claim 1, wherein the base vehicle transfers the data packets while a network access device of the base vehicle is linked to a predetermined home WLAN of a user of the base vehicle and/or while the network access device is linked to a public WLAN.

3. The method of claim 1, wherein the radio-based communication device is based on a 5G standard and the data packets are transferred independently of any base station of a 5G network via a 5G-based vehicle-to-vehicle communication.

4. The method of claim 1, wherein at least one of the intermediary vehicle and the broker vehicle is a parked vehicle or a moving vehicle.

5. The method of claim 1, wherein at least one of the intermediary vehicle and the broker vehicle receives the data packets for the transferring and forwards them at a later point in time if at least one predetermined connection condition is met.

6. The method of claim 1, wherein the connectivity expectation is determined based on a current position and a planned and/or a predicted driving route and/or a driving destination of the plurality of possible other vehicles.

7. The method of claim 1, wherein copies of the data packets are sent out from the base vehicle, the terminal vehicle, the intermediary vehicle, or the broker vehicle to the plurality of possible other vehicles for forwarding, wherein after a predetermined period of time and/or a predetermined number of forwardings, the copies are deleted if the copies have not yet reached a predetermined recipient, and wherein the predetermined recipient is the terminal vehicle or the base vehicle.

8. A system for linking a terminal vehicle with a stationary data network, the system comprising a base vehicle, an intermediary vehicle, a broker vehicle and the terminal vehicle, wherein the system is configured to:
   check, by the terminal vehicle, a connectivity expectation for a plurality of possible other vehicles, wherein the connectivity expectation indicates a usability of the plurality of possible other vehicles as a possible base vehicle;
   select, based on a predetermined routing protocol, by the terminal vehicle, the base vehicle out of the plurality of possible other vehicles, wherein the base vehicle is a part of a link connecting the terminal vehicle and the stationary data network, wherein the link has a highest probability and/or a shortest time compared with other possible links comprising a different base vehicle;
   transfer, by the base vehicle, data packets between the stationary data network and the terminal vehicle by means of a radio-based communication device of the base vehicle, wherein the base vehicle has a direct network access to the stationary data network;
   link, by the broker vehicle, the base vehicle with the terminal vehicle for a range extension; and
   transfer, by the intermediary vehicle, the data packets between the base vehicle and the terminal vehicle for the range extension,
   wherein the connectivity expectation is determined from a predicted position based on a charging state of an energy store, a route, or a destination of the plurality of possible other vehicles, and
   wherein the base vehicle transfers the data packets while it is connected to an electrical charging station via a charging cable for an electrical charging process and the direct network access exists.

* * * * *